Oct. 22, 1963  K. BECK  3,107,651
EDIBLE TOY BALL FOR DOGS
Filed Aug. 17, 1961

INVENTOR.
KURT BECK

BY Percy Freeman
ATTORNEY.

United States Patent Office 3,107,651
Patented Oct. 22, 1963

3,107,651
EDIBLE TOY BALL FOR DOGS
Kurt Beck, Vreden, Westphalia, Germany, assignor to Fred Hichenberg, Rockville Centre, N.Y., and himself, jointly
Filed Aug. 17, 1961, Ser. No. 132,169
5 Claims. (Cl. 119—29)

This invention relates to accessories for animals or pets, and is especially concerned with an accessory adapted to provide amusement and exercise for animals.

As is well known, animals, especially dogs, find great entertainment as well as exercise in playing with rubber balls. However, such balls, while affording running and chewing exercises, are often subject to damage under the biting action of dogs, which may result in swallowing the material of the ball, usually rubber. This can have serious consequences and require surgery to remove the rubber pieces.

It is, therefore, one object of the present invention to provide an exercising device and plaything for animals, which affords the advantages of conventional animal balls, and is further uniquely attractive to animals by reason of its scent, and which, if bitten, and pieces swallowed by an animal, produces no deleterious effects, but is entirely digestible and healthful.

It is a further object of the present invention to provide a method of manufacturing an animal plaything of the type described, which method is extremely simple and economical, employing a minimum of quick and easy operations, without requiring expensive materials or apparatus.

It is a more particular object of the present invention to provide an animal ball which is adapted to be fabricated of a single integral piece of rawhide in a manner resulting in a staunch and durable structure having great appeal to animals, and which is entirely safe and harmless, even if parts of the ball are bitten off and swallowed.

Other objects of the present invention will become apparent upon reading the following specification and referring to the accompanying drawings, which form a material part of this disclosure.

The invention accordingly consists in the features of construction, combinations of elements, arrangements of parts, and method steps as will be more fully described hereinafter, and of which the scope will be indicated by the appended claims.

Figure 1:
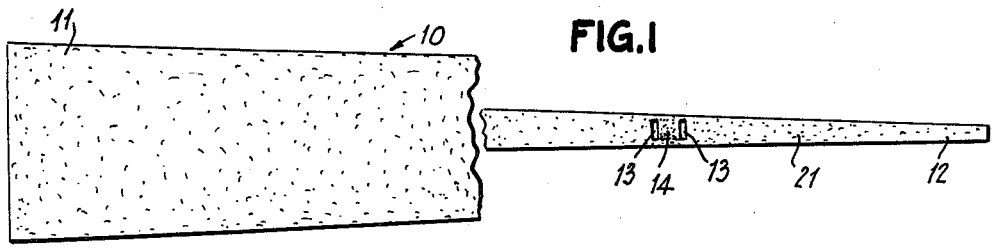
FIG. 1 is a plan view showing an element adapted to be formed into an animal plaything in accordance with the teachings of the present invention, the illustrated element being broken away for conservation of drawing space.
Figure 2:
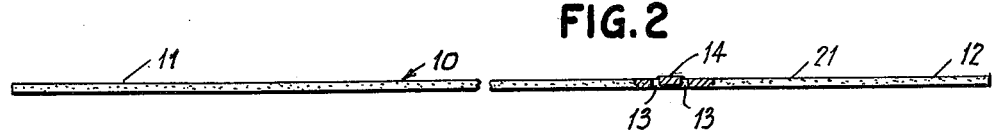
FIG. 2 is a side elevational view showing the element of FIG. 1.
Figure 3:
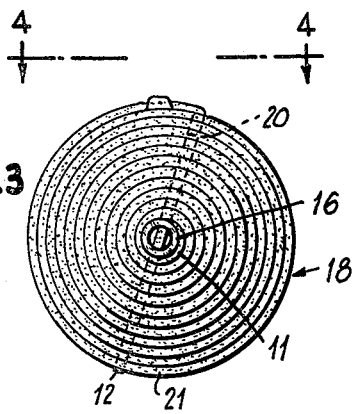
FIG. 3 is an end view of a helically coiled plaything for animals, constructed in accordance with the teachings of the present invention.

Referring now more particularly to the drawings, and specifically to FIGS. 1 and 2 thereof, an elongate strip is shown therein and generally designated 10. The strip 10 is advantageously fabricated of rawhide or other material having similar physical and chemical characteristics, preferably being attractive to and digestible by animals. The strip 10 is relatively long, being broken away in the drawing, and is configured such that its lateral dimension tapers from its wider or larger end 11 to its narrower or smaller end 12, being symmetrical about the longitudinal centerline. Adjacent to and spaced inward from the narrower or smaller end 12, the strip 10 may be provided with a pair of parallel, closed end cuts 13 extending transversely of the strip and defining of the material 14 between the cuts a loop adapted to be displaced out of the plane of the strip, as seen in FIG. 2.

In accordance with the method of the instant invention, a generally cylindrical tube 16, see FIGS. 3–6, is provided, which tube is also preferably fabricated of rawhide or similar digestible material. The cylindrical tube 16 is employed as a core or spindle upon which to wind the strip 10.

Figure 4:
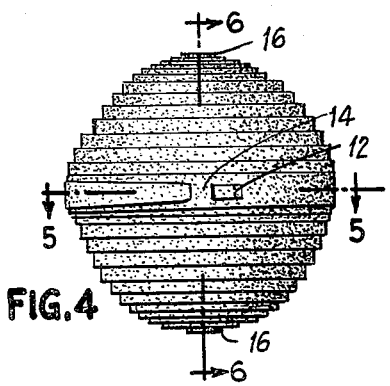
FIG. 4 is a view showing the article of FIG. 3, and taken at right angles thereto, as along the line 4—4 of FIG. 3.
Figure 6:
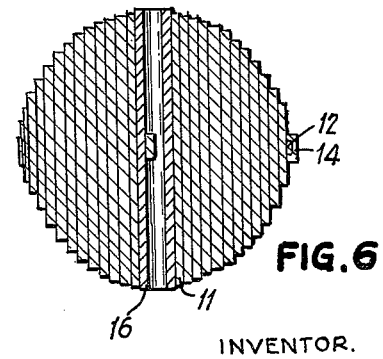
FIG. 6 is a diametral sectional view taken substantially along the line 6—6 of FIG. 4, at right angles to the view of FIG. 5.

More particularly, the larger end 11 of the strip 10 is initially wound about the tube or core 16, and the remainder of the strip is subsequently tightly helically coiled or wound about the central core as an axis. In this condition, as seen in FIGS. 3–6, the strip 10 is wound to define a tight helix or coil 18. As the strip 10 is configured with its lateral dimension tapering symmetrically in the direction away from the larger inner end 11 of the coil 18, each successive convolution of the coil will be of decreasing lateral dimension or width, so that the external configuration of the coil defines a somewhat spherical contour, in the manner of a rollable element or ball. As best seen in FIG. 4, the external configuration of the coil 18 may be considered as stepped, or reduced by steps, in the direction from one diametral plane, as the plane 5—5, outward along a diametral axis, as the line 6—6. The coil 18 is thus ball-like or rollable, and moreover the stepped configuration affords a multitude or surfaces in angular relation presented to an animal or biting and effective exercise of the teeth.

Figure 5:
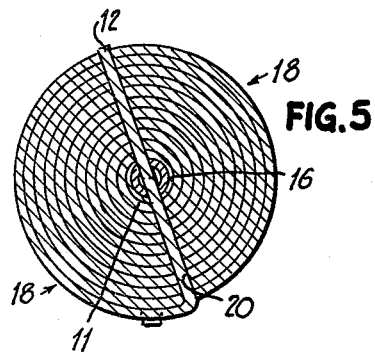
FIG. 5 is a diametral sectional view taken substantially along the line 5—5 of FIG. 4.

As best seen in FIG. 5, the coil 18 is formed with a drill hole or bore 20 extending diametrically through the spherical configuration, say in a direction normal to and intersecting with the central tube or core 16, medially thereof.

After winding of the strip 10, the strip end region 21 between the smaller strip end 12 and the loop 14 defines the outer convolution of the coil. The smaller strip end 12 is engaged through the slits 13 beneath the loop 14, and then inserted into the bore 20 diametrically through the coil.

The loop 14, receiving the coil end portion 21 which defines the outer coil convolution, serves to secure the latter in place. This, of course, retains the entire coil in its coiled condition. Further, engagement of the coil end 12 through the bore 20 effectively locks the strip end in the bore, as any tendency of the coil to uncoil serves to enhance gripping action by the several coil convolutions of the inserted strip end. Hence, an effectively secured, tightly wound helical coil of spherical external configuration is provided. It should also be noted that the diametrical engagement of the strip end 12 transversely through the coil convolutions and central core insures that the convolutions and core retain their relative positions longitudinally of the coil axis.

If desired, the coil 18 may be provided with an external coating of any suitable material, such as rawhide preservative, or coloring or other compound to enhance attractiveness of the device to animals.

From the foregoing, it is seen that the instant invention provides an exercising device and plaything for animals and method of manufacturing the same which fully accomplish their intended objects and are well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. A plaything for animals comprising a helically coiled strip of digestible material having its outer end secured to retain the strip coiled for free rolling thereof, said strip being formed with a transverse slit adjacent to and spaced from its outer end for receiving the outer strip end to effectively secure the latter.

2. A plaything for animals comprising a helically coiled strip of digestible material having its outer end secured to retain the strip coiled for free rolling thereof, said coil being formed with a diametral bore extending through each convolution of said coil, and the outer end of said strip being engaged in said bore for securement of said outer strip end.

3. An exercising device and plaything for animals comprising a tight helically wound strip of digestible material defining a coil, said strip having its lateral dimension tapering in the direction from its inner toward its outer end to provide a generally spherical external configuration for said coil, and means securing the outer convolution of said coil to retain said strip coiled, in combination with a tube of digestible material centrally within said coil and providing a core upon which said strip is wound, said coil being formed with a diametral bore extending through each convolution of said coil and said core, the outer end of said strip being engaged in said bore.

4. In the method of manufacturing an accessory for animals, the steps which comprise: providing a strip of digestible material having its lateral dimension tapering in the direction from one strip end toward the other strip end, helically winding said coil from said one strip end toward said other strip end to form a coil having a generally spherical external configuration, and securing said other strip end to retain said strip in its coiled condition, said securing including forming a diametral bore extending through several convolutions of said coiled strip, and inserting said other strip end in said bore.

5. The method according to claim 4, said securing further including forming a slit in the outer convolution of said coiled strip spaced from said other strip end, and inserting said other strip end through said slit prior to insertion in said hole.

References Cited in the file of this patent
UNITED STATES PATENTS

| | | |
|---|---|---|
| 1,149,170 | Allis | Aug. 10, 1915 |
| 2,051,682 | Couture | Aug. 18, 1936 |
| 2,185,547 | Fowler | Jan. 2, 1940 |
| 2,988,045 | Fisher | June 13, 1961 |

OTHER REFERENCES

"Encyclopedia of Cooking," by Myra Givens, published 1947, page 509.